(12) United States Patent
Liu (10) Patent No.: US 8,385,699 B2
(45) Date of Patent: Feb. 26, 2013

(54) AMPLIFIED BROADBAND FIBER LASER SOURCE

(76) Inventor: Jian Liu, Sunnyvale, CA (US)

( * ) Notice: Subject to any disclaimer, the term of this patent is extended or adjusted under 35 U.S.C. 154(b) by 356 days.

(21) Appl. No.: 12/846,806

(22) Filed: Jul. 29, 2010

(65) Prior Publication Data

US 2012/0027031 A1    Feb. 2, 2012

(51) Int. Cl.
*G02B 6/26* (2006.01)
*H01S 3/10* (2006.01)
*H01S 3/00* (2006.01)

(52) U.S. Cl. ............ 385/42; 385/31; 385/122; 385/38; 372/6; 372/21; 359/341.1; 359/341.3

(58) Field of Classification Search ............... 385/122, 385/31, 38, 147, 42; 372/6, 69, 21; 359/337, 359/341.1, 341.3, 345, 346
See application file for complete search history.

(56) References Cited

U.S. PATENT DOCUMENTS

| | | | |
|---|---|---|---|
| 7,130,512 B2 * | 10/2006 | Kuksenkov et al. | 385/122 |
| 7,133,590 B2 * | 11/2006 | Shaw et al. | 385/122 |
| 7,420,994 B2 * | 9/2008 | Korolev et al. | 372/3 |
| 7,668,428 B2 | 2/2010 | Miyabe et al. | |
| 7,679,822 B2 | 3/2010 | Birk et al. | |
| 7,680,379 B2 | 3/2010 | Mannstadt et al. | |
| 7,705,287 B2 | 4/2010 | Tanaka | |
| 2006/0198397 A1 * | 9/2006 | Korolev et al. | 372/3 |
| 2010/0067555 A1 * | 3/2010 | Austin et al. | 372/25 |
| 2012/0027031 A1 * | 2/2012 | Liu | 372/6 |
| 2012/0236314 A1 * | 9/2012 | Fermann et al. | 356/479 |

* cited by examiner

*Primary Examiner* — Brian Healy
(74) *Attorney, Agent, or Firm* — Taboada Law Firm, PLLC; John M. Taboada (57) ABSTRACT

Methods and systems for generating a supercontinuum light source, including generating electromagnetic radiation from a seed laser; coupling the seed laser electromagnetic radiation to a fiber amplifier comprising: a pump laser, a fiber coupler comprising an input and an output, and a nonlinear gain fiber comprising an input and an output, wherein the nonlinear gain fiber is configured to amplify and broaden the electromagnetic radiation from the seed laser; generating electromagnetic radiation from the pump laser; coupling the pump laser electromagnetic radiation and the seed laser electromagnetic radiation into the input of the fiber coupler; coupling the output of the fiber coupler into the input of the nonlinear gain fiber; and coupling out the amplified and broadened electromagnetic radiation from the nonlinear gain fiber. Other embodiments are described and claimed.

46 Claims, 12 Drawing Sheets

AMPLIFIED BROADBAND FIBER LASER SOURCE

BACKGROUND

The invention relates generally to the field of broadband spectrum light source generation.

SUMMARY

In one respect, disclosed is a supercontinuum light source comprising: a seed laser comprising a signal spectrum and a fiber amplifier, wherein the fiber amplifier comprises; a pump laser, a fiber coupler comprising an input and an output, wherein the seed laser and the pump laser are coupled to the input of the fiber coupler, and a nonlinear gain fiber configured to amplify and broaden the signal spectrum of the seed laser, wherein the nonlinear gain fiber comprises an input and an output, wherein the output of the fiber coupler is coupled to the input of the nonlinear gain fiber and a supercontinuum light is coupled out from the output of the nonlinear gain fiber.

In another respect, disclosed is a method for generating a supercontinuum light source, the method comprising: generating electromagnetic radiation from a seed laser; coupling the seed laser electromagnetic radiation to a fiber amplifier comprising: a pump laser, a fiber coupler comprising an input and an output, and a nonlinear gain fiber comprising an input and an output wherein the nonlinear gain fiber is configured to amplify and broaden the electromagnetic radiation from the seed laser; generating electromagnetic radiation from the pump laser; coupling the pump laser electromagnetic radiation and the seed laser electromagnetic radiation into the input of the fiber coupler; coupling the output of the fiber coupler into the input of the nonlinear gain fiber; and coupling out the amplified and broadened electromagnetic radiation from the nonlinear gain fiber.

Numerous additional embodiments are also possible.

BRIEF DESCRIPTION OF THE DRAWINGS

Other objects and advantages of the invention may become apparent upon reading the detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

A supercontinuum (SC) light source is a broadband spectrum light source whose bandwidth is larger than the pump laser spectral bandwidth. Conventional SC light sources use either high power continuous wave (CW) or pulsed pump lasers to pump a piece of highly nonlinear fiber. The pump laser may either be a solid state laser or fiber laser operating CW or in nanosecond, picosecond, or femtosecond pulses. The nonlinear fiber used to generate the SC light source may comprise a photonic crystal fiber or tapered fiber, whose dispersion matches the pump laser wavelength.

Figure 1A:
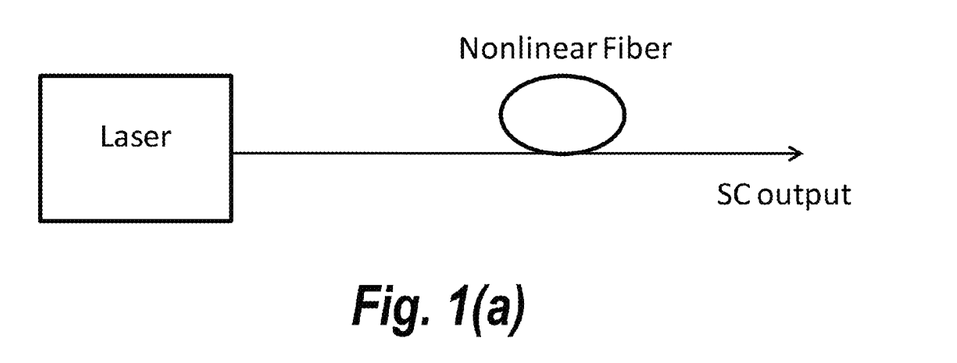
FIGS. 1(a) and (b) are schematic diagrams illustrating two conventional methods of generating supercontinuum light sources, in accordance with some embodiments.
Figure 1B:
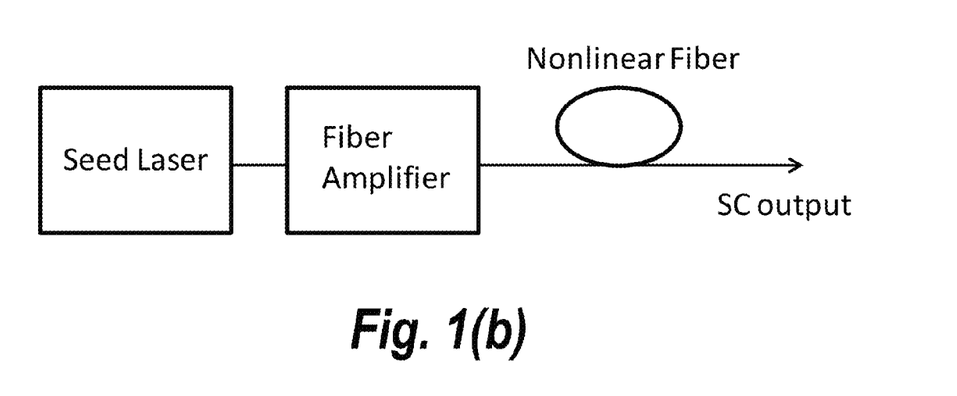

FIGS. 1(a) and (b) are schematic diagrams illustrating two conventional methods of generating supercontinuum light sources, in accordance with some embodiments.

In conventional methods of generating an SC light source, a laser pumps a nonlinear fiber. The laser may either be a solid state laser as shown in FIG. 1(a), a fiber laser as shown in FIG. 1(b), or some combination of both. The laser sources may be attached to the nonlinear fibers by free space coupling or fiber splicing. The nonlinear fibers used in the conventional approaches of generating an SC light source do not amplify the input laser signal as they are not doped with any gain medium. Conventionally, the nonlinear fiber is not part of the laser and has no active function for amplifying the laser signal. The gain is coming from the laser source and the nonlinear fiber is used to merely generate the SC light source by accepting the external pump laser signal.

Figure 2:
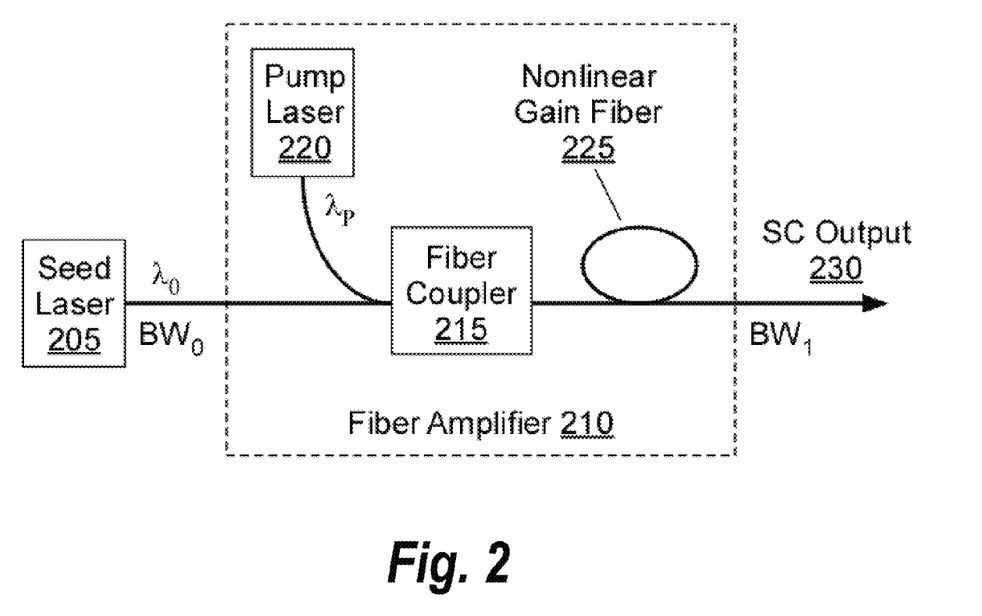
FIG. 2 is a schematic diagram of a system where the supercontinuum light source is generated within the fiber amplifier, in accordance with some embodiments.

FIG. 2 is a schematic diagram of a system where the supercontinuum light source is generated within the fiber amplifier, in accordance with some embodiments.

In some embodiments, the nonlinear fiber is designed as part of the gain medium. The nonlinear gain fiber then functions as an amplifier of the seed laser signal and a generator of the supercontinuum light source. A seed laser 205 operating at $\lambda_0$, in the range between 100 nm to 20 μm, and with a spectral bandwidth of $BW_0$ is coupled to a fiber amplifier 210. The seed laser 205 may be a solid state laser or fiber laser. The gain medium of the seed laser 205 may be Ytterbium (Yb), Erbium (Er), Thulium (Tm), Neodymium (Nd), Holmium (Ho), ytterbium doped potassium tungstates (namely Yb:KYW and Yb:KGW), yttrium aluminum garnet (YAG), yttrium orthovanadate ($YVO_4$), Ti:Sapphire, or a combination of two or more ions. The fiber material may be silica, Germanium, Fluoride, Chalcogenide, ZBLAN, or a combination of two or more types of materials. The fiber amplifier 210 comprises a fiber coupler 215, a pump laser 220, and a nonlinear gain fiber 225. The fiber coupler 215 couples the electromagnetic radiation from the pump laser 220 operating at $\lambda_P$ with the electromagnetic radiation from the seed laser 205. The combined electromagnetic radiation is then coupled to a nonlinear gain fiber 225. The nonlinear gain fiber 225 of the fiber amplifier 210 amplifies the electromagnetic radiation from the seed laser 205 and broadens the spectral bandwidth to $BW_1$ to create the supercontinuum output 230. The spectral bandwidth is broadened through one or more processes such as self phase modulation (SPM), Raman frequency shift, four wave mixing (FWM), soliton fission, etc. If the broadened spectrum is within the gain bandwidth of the nonlinear gain fiber, the broadened spectrum may also be amplified. Since the spectral bandwidth of the amplified electromagnetic radiation $BW_1$ is larger than the spectral bandwidth of $BW_0$, the ratio of $BW_1$ to $BW_0$ is larger than one. By using the appropriate nonlinear gain fiber, the seed laser amplification and broadening process may range between 100 nm to 20 µm.

Figure 3A:
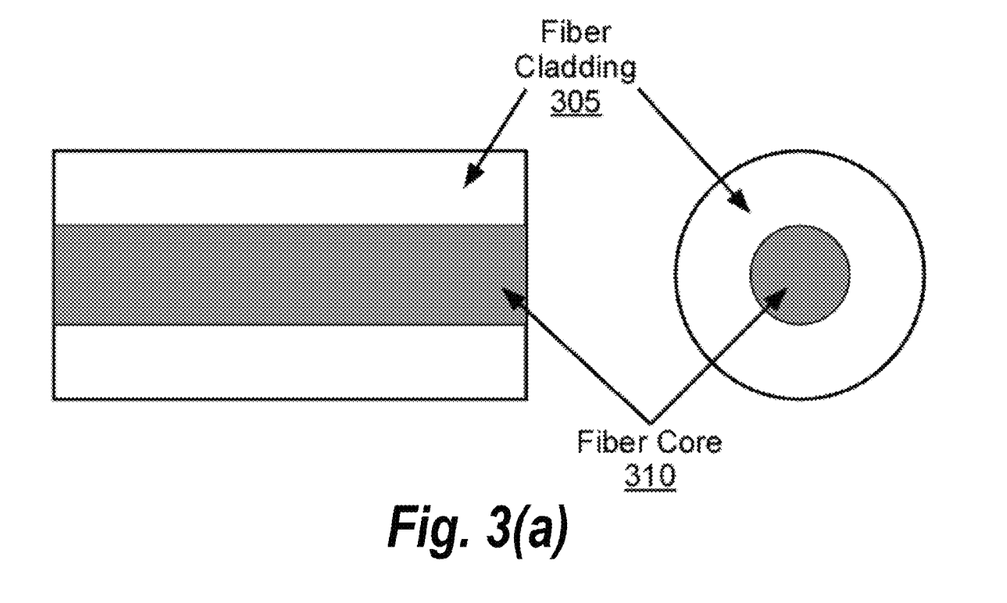
FIGS. 3(a) and (b) are schematic representations of the nonlinear gain fiber in the amplifier stage, in accordance with some embodiments.
Figure 3B:
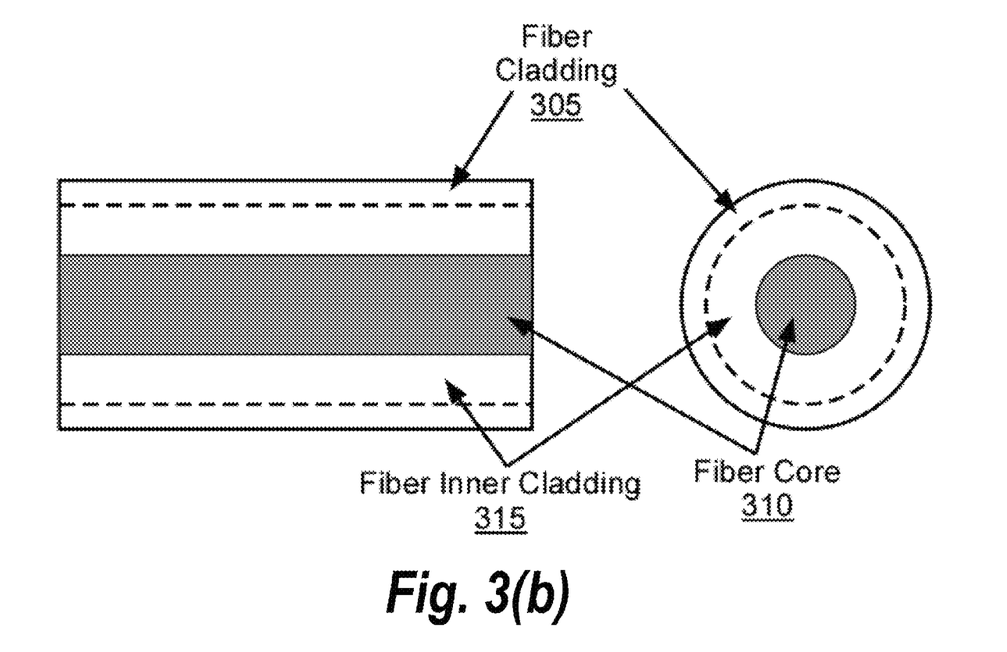

FIGS. 3(a) and (b) are schematic representations of the nonlinear gain fiber in the amplifier stage, in accordance with some embodiments.

In some embodiments, in the amplifier stage, the fiber coupler may be a single mode fiber coupler to couple a single mode pump laser or a bundled fiber coupler to couple a multimode pump laser. The fiber coupler couples the seed laser wavelength $\lambda_0$ and the pump laser wavelength $\lambda_P$ into the nonlinear gain fiber of the amplifier. Depending on the mode of the pump laser, the nonlinear gain fiber may be either single cladding fiber or double cladding fiber. For a single mode pump laser, the nonlinear gain fiber may be single cladding fiber as shown in FIG. 3(a) with a single fiber cladding 305 surrounding a fiber core 310. For a multimode pump laser, the nonlinear gain fiber may be double cladding fiber as shown in FIG. 3(b). In the double cladding fiber there is a fiber inner cladding 315 between the fiber cladding 305 and the fiber core 310. The gain medium of the nonlinear gain fiber of the amplifier may be Yb, Er, Tm, Nd, Ho, ytterbium doped potassium tungstates (namely Yb:KYW and Yb:KGW), yttrium aluminum garnet (YAG), yttrium orthovanadate ($YVO_4$), Ti:Sapphire, or a combination of two or more ions. The fiber material may be silica, Germanium, Fluoride, Chalcogenide, ZBLAN, or a combination of two or more types of materials. The fiber structure can be single cladding fiber and/or double cladding fibers.

Figure 4:
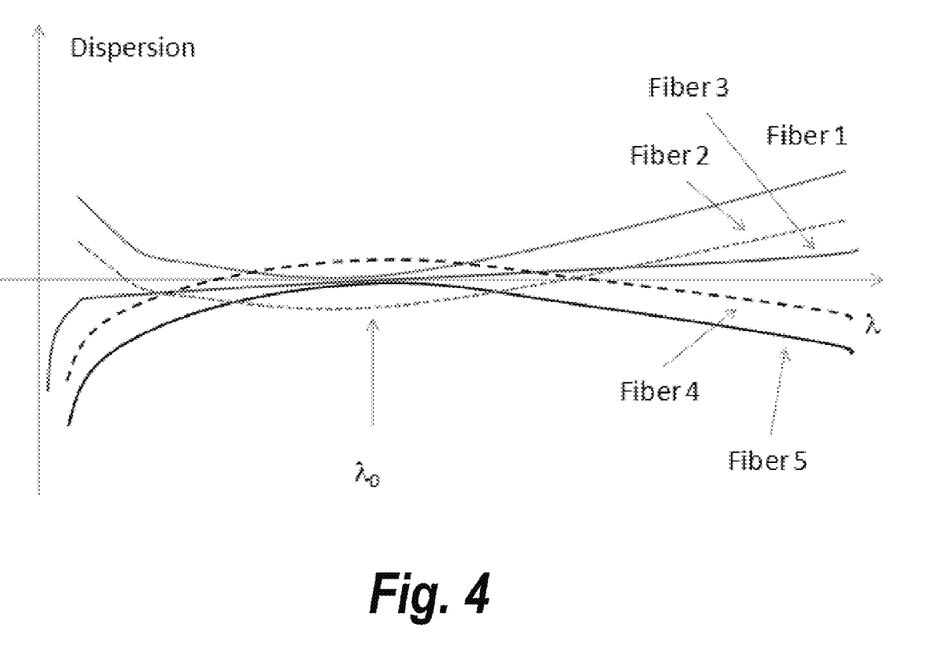
FIG. 4 is a graph showing the dispersion for five examples of nonlinear gain fibers, in accordance with some embodiments.

FIG. 4 is a graph showing the dispersion for five examples of nonlinear gain fibers, in accordance with some embodiments.

In some embodiments, the gain fiber structure of the amplifier will have nonlinear properties and proper dispersion to facilitate dispersion. The nonlinear gain fiber may be a regular fiber such as SM28 (NA=0.1, core size of 10 microns), a high numerical aperture (NA>0.1) fiber with small core diameter, or a photonic crystal structure fiber (PCF). Ideally, the dispersion of the nonlinear gain fiber should be as close to zero as possible over the supercontinuum spectral bandwidth. Additionally, the zero dispersion should match the seed laser wavelength $\lambda_0$. Typical wavelengths of $\lambda_0$ are 515 nm, 780 nm, 800 nm, 980 nm, 1030 nm, 1047 nm, 1064 nm, 1550 nm, 2 µm, 2.7 µm, and 3.0 µm. FIG. 4 shows some examples of the dispersion for five nonlinear fibers. Fibers 1, 3, and 5 all have one zero dispersion at approximately the seed laser wavelength. Fibers 2 and 4 have two zero dispersions close to the seed laser wavelength. The zero dispersion may also be off, either shorter or longer, than the pump wavelength. However, having the pump wavelength closer to the zero-dispersion will ease the broadening of the spectrum and keep the spectrum in a good phase relation (high coherence).

As an example, in some embodiments, photonic crystal fibers (PCF) with flattened dispersion profiles may be used for wide supercontinuum generation with a signal laser wavelength $\lambda_0$ centered around 1 µm. Various lattice structure geometries, hole diameters d, pitch $\Lambda$, and ring number Nr may be modified to achieve flattened dispersion profiles in PCF. There are essentially two different kinds of photonic crystal fibers: solid-core and hollow-core microstructured fibers (MOFs). Solid-core MOFs work on the principle of modified total internal reflection while the guiding mechanism in hollow-core MOFs is based on band gaps. Hexagonal, solid-core MOFs are used in this embodiment. The main parameter of a fiber is its effective index of refraction whose real part contains the dispersion information D, whereas the imaginary part allows the calculation of the losses L. The equations for dispersion and losses are shown in equations (1) and (2), respectively.

$$D = -\frac{\lambda}{c}\frac{\partial^2 \text{Re}(n_{\textit{eff}})}{\partial \lambda^2} \quad (1)$$

$$L = \frac{40\pi}{\ln(10)\lambda}\text{Im}(n_{\textit{eff}}) \quad (2)$$

The effective index is composed of the material part and the geometric part as expressed in equation (3).

$$n_{\textit{eff}} = n_{\textit{eff}}^{mat} + n_{\textit{eff}}^{geom} \quad (3)$$

For a given material, only the geometric part can be influenced to change the effective index. Additionally, losses may result from the bending of the fiber. These losses are difficult to model but order of magnitude results can be obtained via the effective area of the modes.

Figure 5:
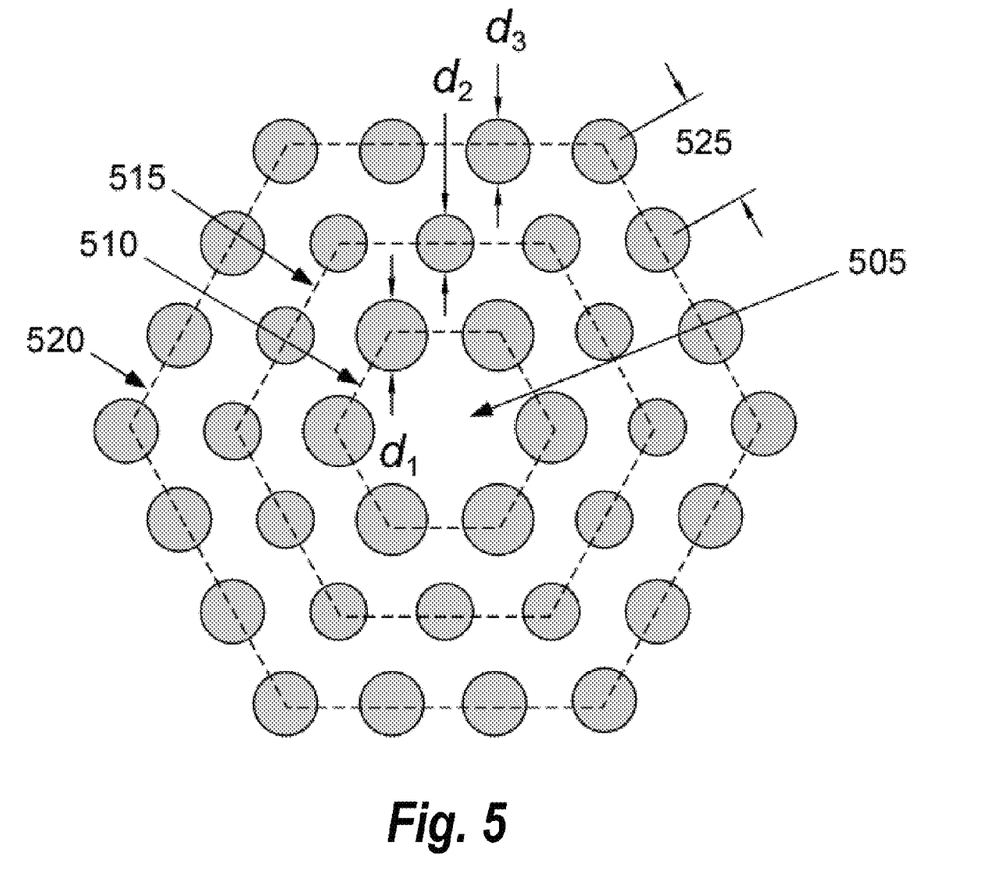
FIG. 5 is a schematic cross-section of hexagonal photonic crystal fiber, in accordance with some embodiments.

FIG. 5 is a schematic cross-section of hexagonal photonic crystal fiber, in accordance with some embodiments.

In some embodiments, as shown in FIG. 5, the cross-sectional geometry around the core in a hexagonal PCF is modified. The central core region 505 is surrounded by a first ring of air-holes 510 having diameter $d_1$, a second ring of air-holes 515 having diameter $d_2$, and a third ring of air-holes 520 having diameter $d_3$. The dashed lines in FIG. 5 are used to illustrate the hexagonal ring geometry of the PCF. The center-to-center spacing 525 between the air-holes is defined as the pitch $\Lambda$. By properly tailoring the air-hole diameters $d_1$, $d_2$, and $d_3$ as well as the pitch, the design of the PCF may be optimized such that the dispersion profile is flattened around 1030 nm.

FIGS. 6(a), 6(b), 7(a), 7(b), 8(a), 8(b), 9(a), 9(b), 10(a), and 10(b) are graphs of the dispersion profiles of hexagonal PCFs across the 1030 nm bandwidth, in accordance with some embodiments.

Figure 6A:
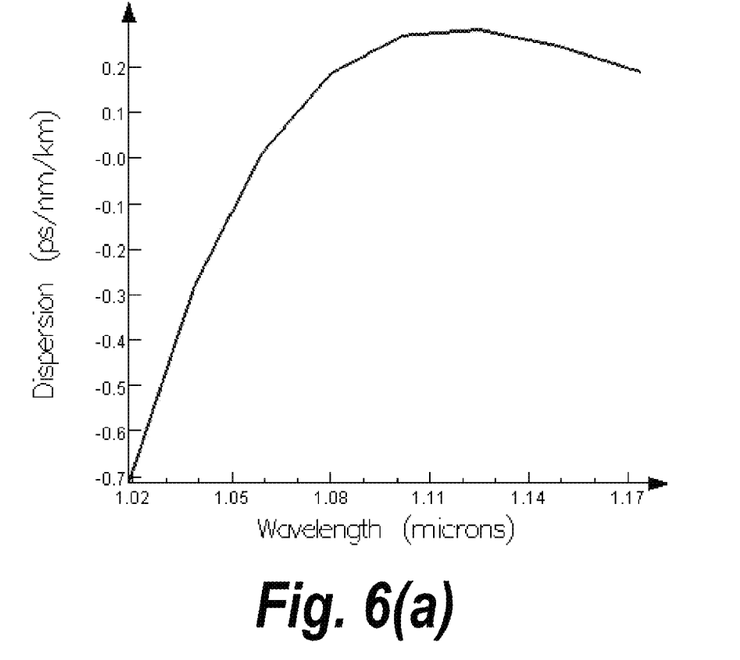
FIGS. 6(a), 6(b), 7(a), 7(b), 8(a), 8(b), 9(a), 9(b), 10(a), and 10(b) are graphs of the dispersion profiles of hexagonal PCFs across the 1030 nm bandwidth, in accordance with some embodiments.
Figure 6B:
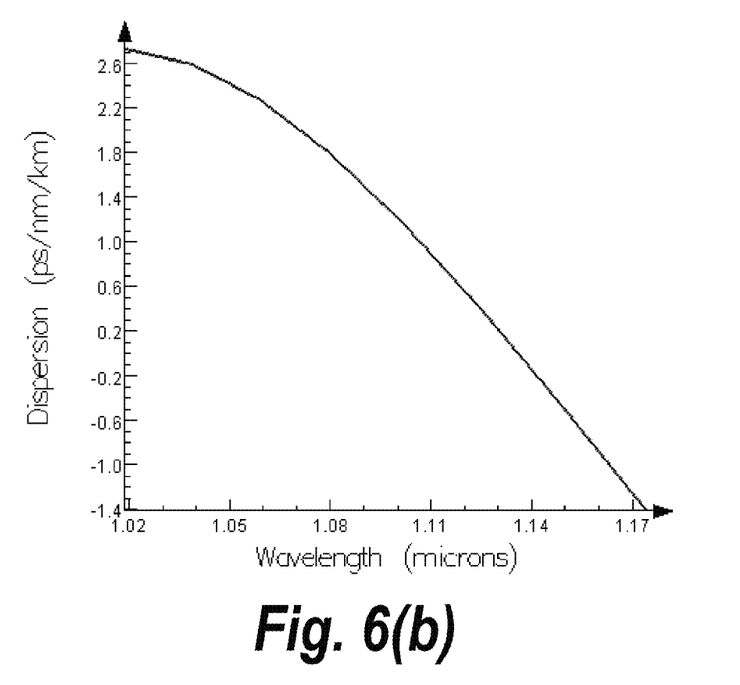
Figure 7A:
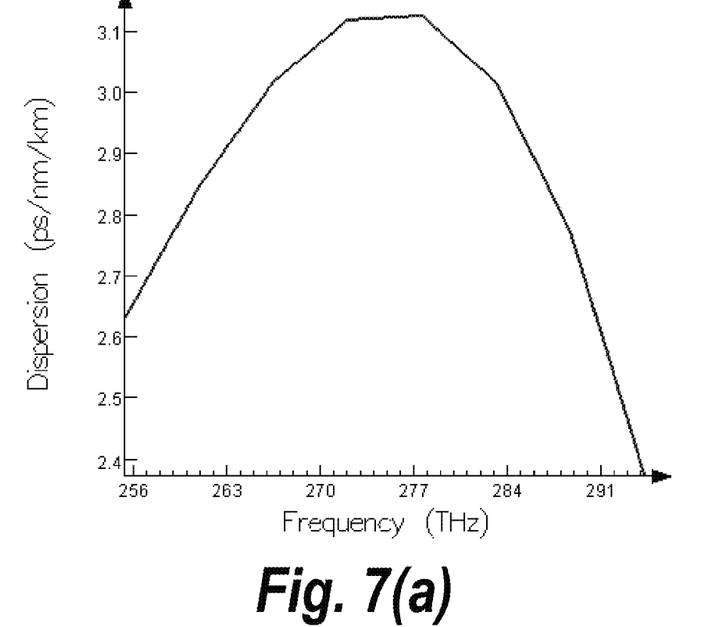
Figure 7B:
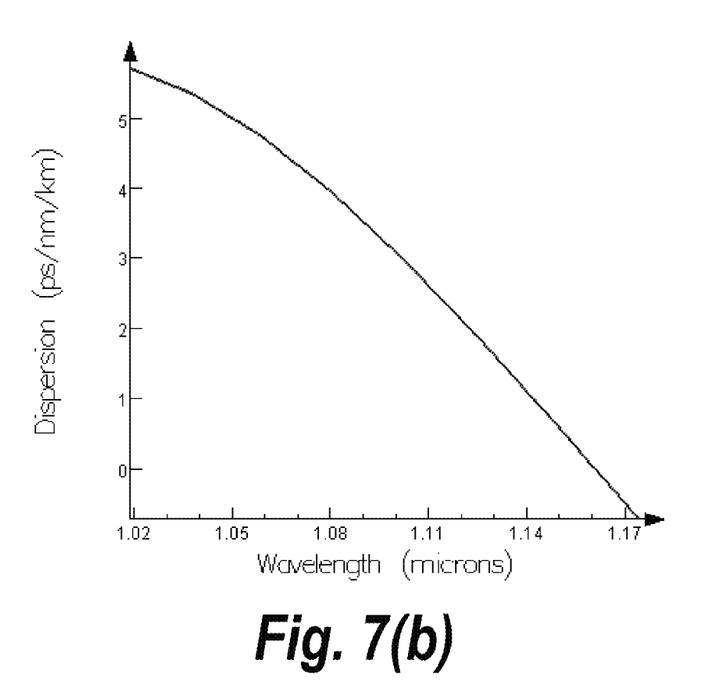
Figure 8A:
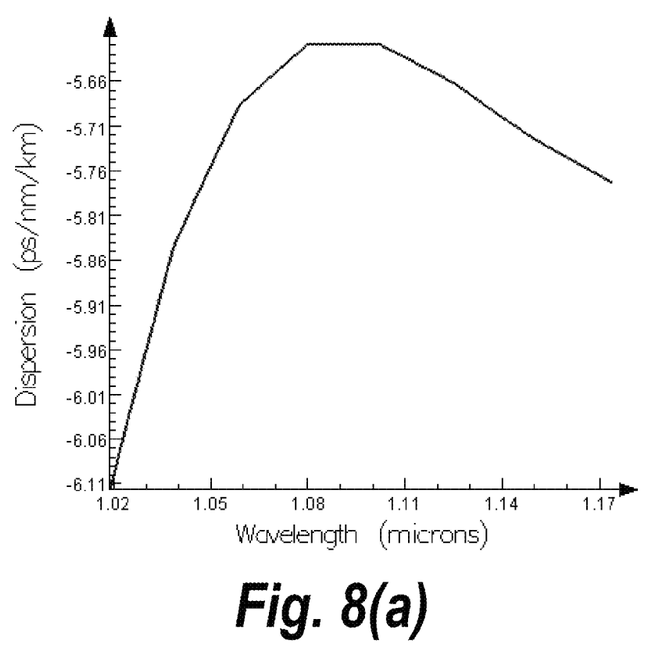
Figure 8B:
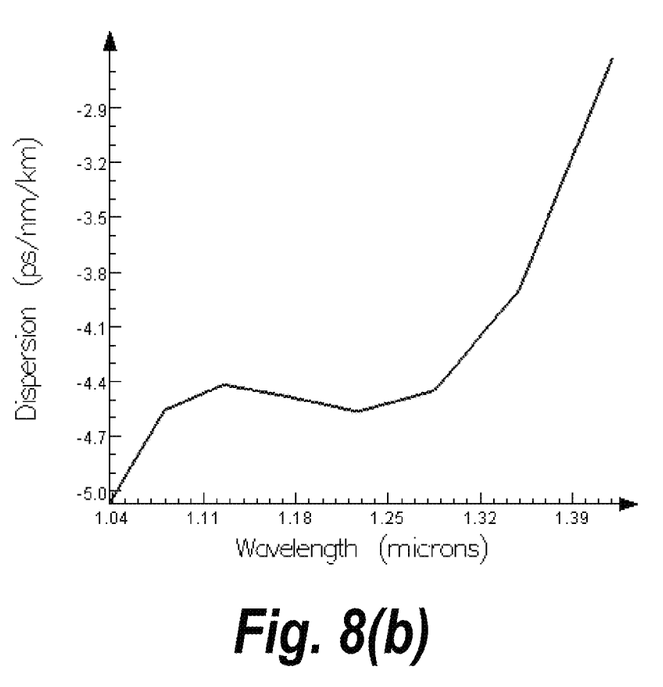
Figure 9A:
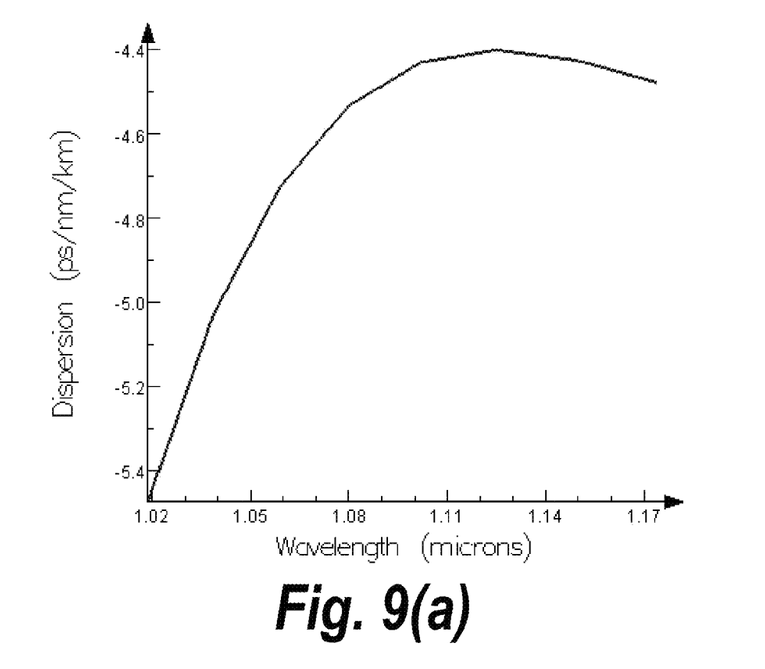
Figure 9B:
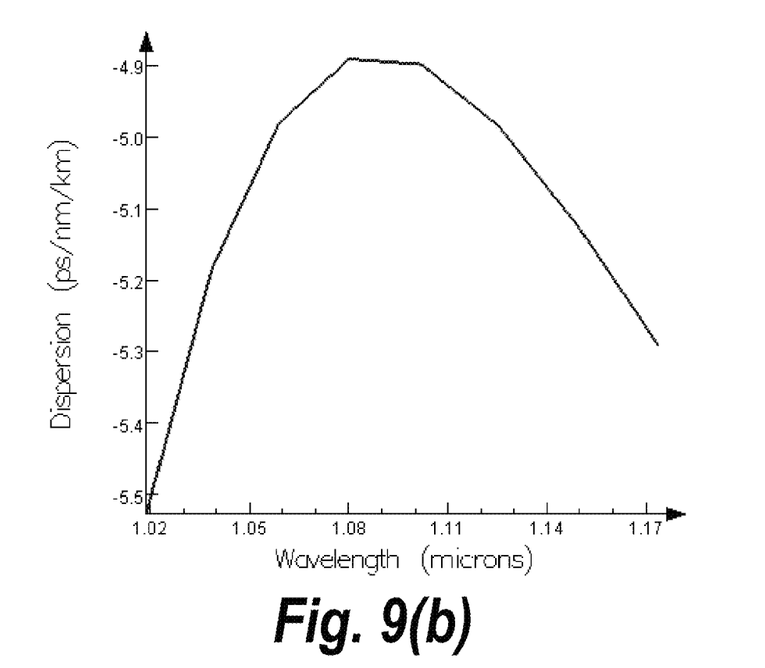
Figure 10A:
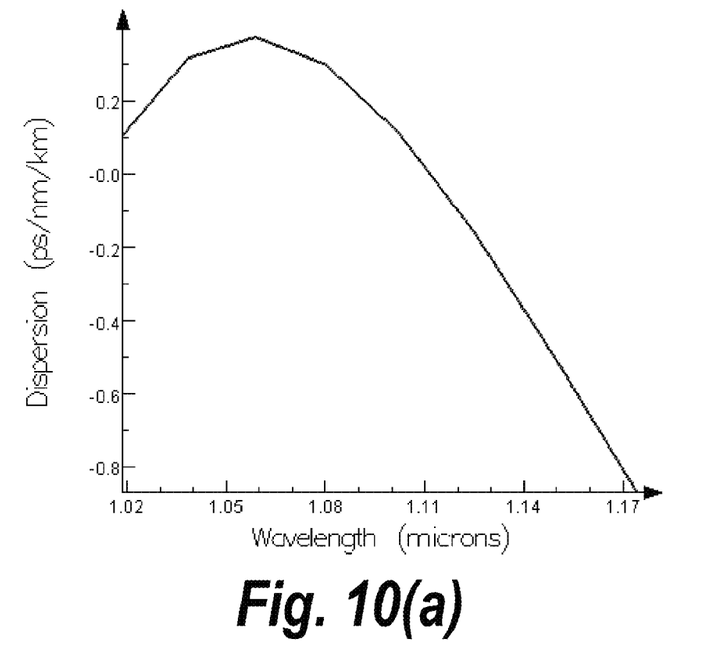
Figure 10B:
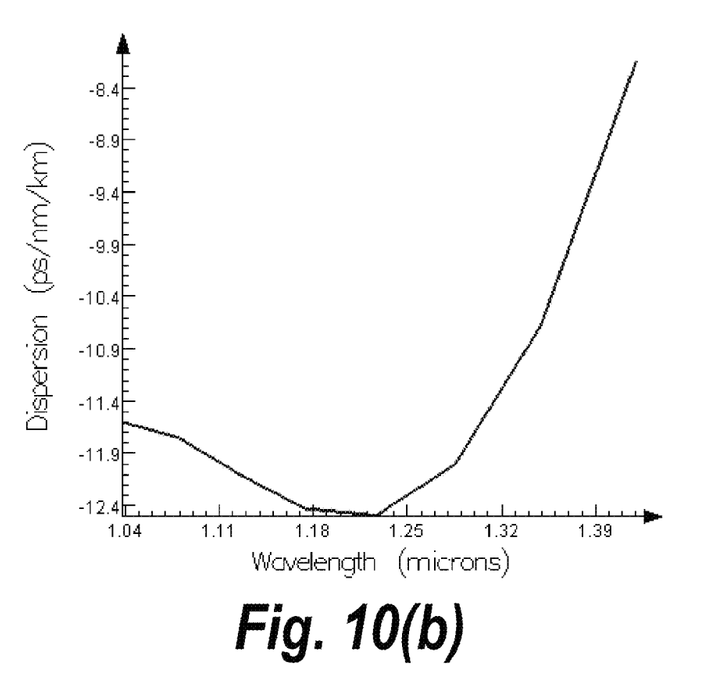

In some embodiments, as shown in FIGS. 6(a), 6(b), 7(a), 7(b), 8(a), 8(b), 9(a), 9(b), 10(a), and 10(b), the air-hole diameters, d, of the first few rings and the pitch, $\Lambda$, are varied in order to flatten the dispersion profiles across the 1030 nm bandwidth. In all the dispersion profiles, the ratio of the hole diameter d to the pitch $\Lambda$ (d/$\Lambda$) is equal to 0.9. In FIGS. 6(a) and 6(b), the diameters of the air-holes of the first ring are modified. In FIG. 6(a) the pitch is equal to 0.95 µm and $d_1$ is equal to 0.37 µm. In FIG. 6(b) the pitch is equal to 0.97 µm and $d_1$ is equal to 0.4 µm. In FIGS. 7(a) and 7(b), the diameters of the air-holes of the first ring are modified and in FIG. 7(b), the diameters of the air-holes of the second ring are also modified. In FIG. 7(a) the pitch is equal to 0.97 µm and $d_1$ is equal to 0.38 µm. In FIG. 7(b) the pitch is equal to 0.97 µm, $d_1$ is equal to 0.42 µm, and $d_2$ is equal to 0.86 µm. In FIGS. 8(a) and 8(b), the diameters of the air-holes of the first ring are modified. In FIG. 8(a) the pitch is equal to 0.915 μm and $d_1$ is equal to 0.36 μm. In FIG. 8(b) the pitch is equal to 0.925 μm and $d_1$ is equal to 0.336 μm. In FIGS. 9(a) and 9(b), the diameters of the air-holes of the first and second rings are modified and in FIG. 9(a), the diameters of the air-holes of the third ring are also modified. In FIG. 9(a) the pitch is equal to 0.925 μm, $d_1$ is equal to 0.348 μm, $d_2$ is equal to 0.84 μm, and $d_3$ is equal to 0.86 μm. In FIG. 9(b) the pitch is equal to 0.925 μm, $d_1$ is equal to 0.354 μm, and $d_2$ is equal to 0.84 μm. Finally, in FIGS. 10(a) and 10(b), the diameters of the air-holes of the first ring are modified. In FIG. 10(a) the pitch is equal to 0.955 μm and $d_1$ is equal to 0.36 μm. In FIG. 10(b) the pitch is equal to 0.9 μm and $d_1$ is equal to 0.36 μm. As can be seen in the FIGS. 6-10, the desired dispersion profiles may be obtained by any number of changes in the cross-sectional geometries of the PCF.

Figure 11:
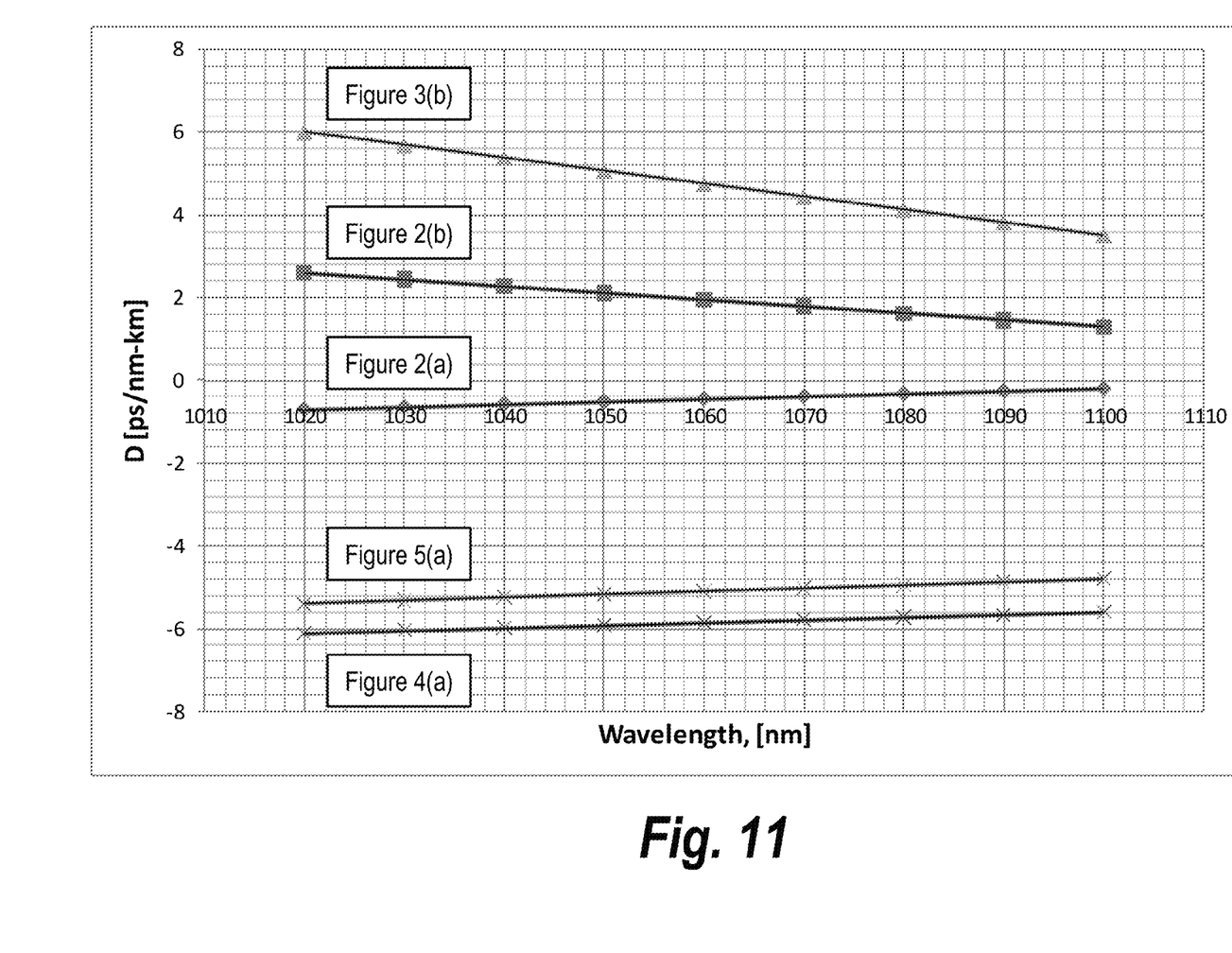
FIG. 11 is a graph showing the combined dispersion profiles from FIGS. 2(a), 2(b), 3(b), 4(a), and 5(a) over a range of 80 nm, in accordance with some embodiments.

FIG. 11 is a graph showing the combined dispersion profiles from FIGS. 2(a), 2(b), 3(b), 4(a), and 5(a) over a range of 80 nm, in accordance with some embodiments.

In some embodiments, as shown in FIG. 11, the change in the dispersion slope over a range of 80 nm around 1060 nm is small. Thus, the dispersion slope would not affect the overall performance of the supercontinuum light source. By properly designing the ring structures of the PCF, relatively flat dispersion profiles with zero dispersion at a wavelength of interest may be achieved. It is possible to design a PCF fiber with reasonable tolerance in order to achieve a particular dispersion flatness or slope and a particular dispersion for a wavelength range of interest.

In some embodiments, a conventional gain fiber may be used without any control on dispersion to generate an SC source in the amplifier. This may be possible as long as the energy or peak power is high enough, say for example peak powers greater than 1 kW.

Figure 12:
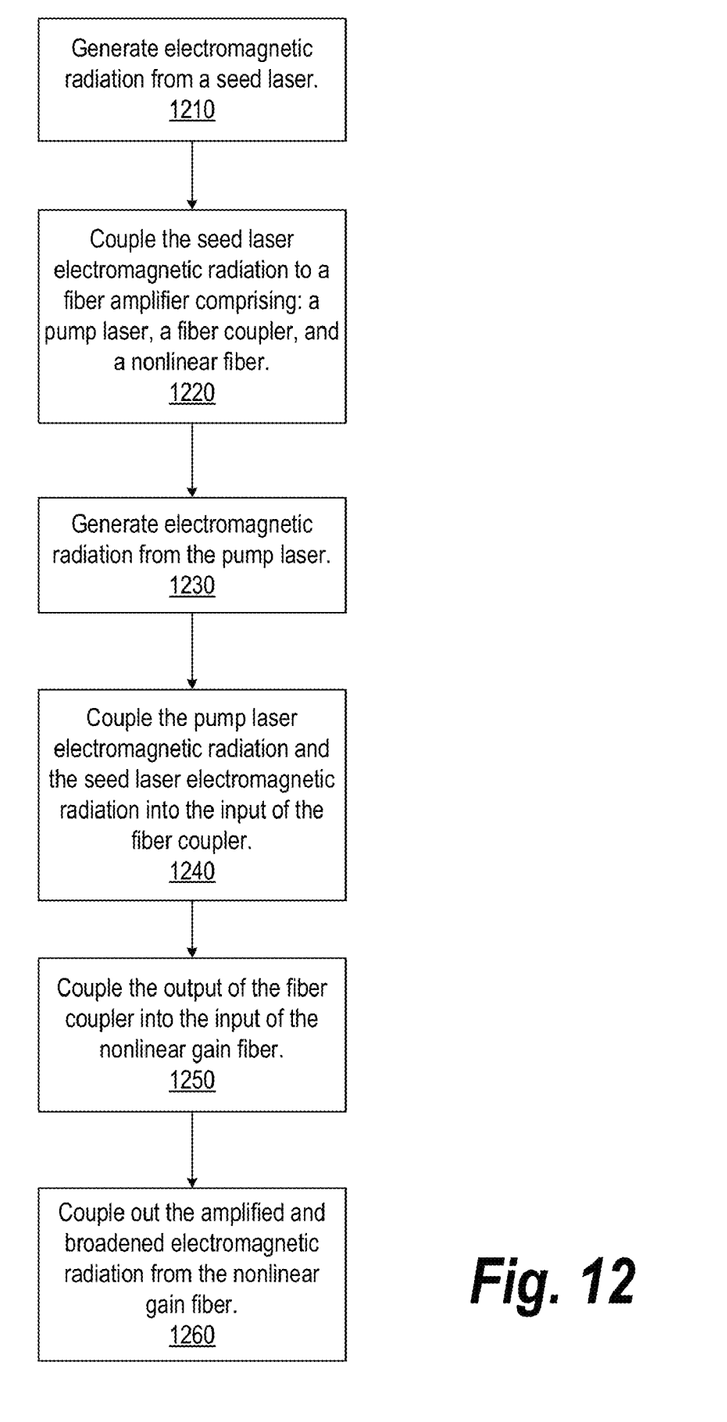
FIG. 12 is a block diagram illustrating a method for generating a supercontinuum light source, in accordance with some embodiments.

FIG. 12 is a block diagram illustrating a method for generating a supercontinuum light source, in accordance with some embodiments.

In some embodiments, a seed laser is used to generate electromagnetic radiation 1210. The seed laser electromagnetic radiation is then coupled to a fiber amplifier comprising: a pump laser, a fiber coupler, and a nonlinear fiber 1220. Within the fiber amplifier, electromagnetic radiation is generated from the pump laser 1230 and then along with the seed laser electromagnetic radiation, coupled into the input of the fiber coupler 1240. The output of the fiber coupler is coupled into the input of the nonlinear gain fiber 1250. Within the nonlinear gain fiber, the seed laser electromagnetic spectrum is amplified and broadened and subsequently coupled out of the nonlinear gain fiber 1260.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A supercontinuum light source comprising:
    a seed laser comprising a signal spectrum; and
    a fiber amplifier, wherein the fiber amplifier comprises;
        a pump laser;
        a fiber coupler comprising an input and an output, wherein the seed laser and the pump laser are coupled to the input of the fiber coupler; and
        a nonlinear gain fiber configured to amplify and broaden the signal spectrum of the seed laser, wherein the nonlinear gain fiber comprises an input and an output, wherein the output of the fiber coupler is coupled to the input of the nonlinear gain fiber and a supercontinuum light is coupled out from the output of the nonlinear gain fiber.

2. The supercontinuum light source of claim 1, wherein the dispersion of the nonlinear gain fiber over the spectral bandwidth of the supercontinuum light is substantially zero.

3. The supercontinuum light source of claim 1, wherein the dispersion of the nonlinear gain fiber over the spectral bandwidth of the supercontinuum light is substantially normal dispersion.

4. The supercontinuum light source of claim 1, wherein the dispersion of the nonlinear gain fiber over the spectral bandwidth of the supercontinuum light is substantially anomalous dispersion.

5. The supercontinuum light source of claim 1, wherein the dispersion of the nonlinear gain fiber over the spectral bandwidth of the supercontinuum light is mixed normal dispersion, zero dispersion, and anomalous dispersion.

6. The supercontinuum light source of claim 1, wherein the zero dispersion of the nonlinear gain fiber over the spectral bandwidth of the supercontinuum light is close to the signal spectrum.

7. The supercontinuum light source of claim 1, wherein the zero dispersion of the nonlinear gain fiber over the spectral bandwidth of the supercontinuum light is away from the signal spectrum.

8. The supercontinuum light source of claim 1, wherein the seed laser comprises a solid state laser or a fiber laser.

9. The supercontinuum light source of claim 1, wherein the seed laser has a center lasing wavelength ranging between 100 nm and 20 μm.

10. The supercontinuum light source of claim 1, wherein the supercontinuum light output has a wavelength ranging between 100 nm and 20 μm.

11. The supercontinuum light source of claim 1, wherein the spectral bandwidth of the supercontinuum light output from the nonlinear gain fiber is broader than the spectral bandwidth of the seed laser.

12. The supercontinuum light source of claim 11, wherein the spectral bandwidth is broadened by at least one of: self phase modulation, Raman frequency shift, four wave mixing, and soliton fission.

13. The supercontinuum light source of claim 1, wherein the spectral bandwidth of the supercontinuum light output from the nonlinear gain fiber is broader than the spectral bandwidth of the seed laser and the gain spectrum supported by the gain medium of the nonlinear gain fiber.

14. The supercontinuum light source of claim 13, wherein the spectral bandwidth is broadened by at least one of: self phase modulation, Raman frequency shift, four wave mixing, and soliton fission.

15. The supercontinuum light source of claim 1, wherein the gain medium of the nonlinear gain fiber is at least one of: Ytterbium, Erbium, Thulium, Neodymium, Holmium, ytterbium doped potassium tungstates (such as Yb:KYW and Yb:KGW), yttrium aluminum garnet, yttrium orthovanadate, and Ti:Sapphire.

16. The supercontinuum light source of claim 1, wherein the fiber material of the nonlinear gain fiber is at least one of: silica, Germanium, Fluoride, Chalcogenide, and ZBLAN.

17. The supercontinuum light source of claim 1, wherein the gain medium of the seed laser is at least one of: Ytterbium, Erbium, Thulium, Neodymium, Holmium, ytterbium doped potassium tungstates (such as Yb:KYW and Yb:KGW), yttrium aluminum garnet, yttrium orthovanadate, and Ti:Sapphire.

18. The supercontinuum light source of claim 1, wherein the nonlinear gain fiber comprises single cladding fiber or double cladding fiber.

19. The supercontinuum light source of claim 1, wherein the nonlinear gain fiber comprises a photonic crystal fiber.

20. The supercontinuum light source of claim 19, wherein the photonic crystal fiber comprises a solid-core microstructured fiber.

21. The supercontinuum light source of claim 20, wherein the solid-core microstructured fiber is surrounded by a hexagonal array of air-holes configured to modify the dispersion profile of the photonic crystal fiber.

22. The supercontinuum light source of claim 20, wherein the solid-core microstructured fiber is surrounded by a hexagonal array of air-holes configured to flatten the dispersion profile of the photonic crystal fiber close to the signal spectrum.

23. The supercontinuum light source of claim 1, wherein the peak power of the supercontinuum light generation inside the nonlinear gain fiber is greater than 1 kW.

24. A method for generating a supercontinuum light source, the method comprising:
   generating electromagnetic radiation from a seed laser;
   coupling the seed laser electromagnetic radiation to a fiber amplifier comprising:
      a pump laser;
      a fiber coupler comprising an input and an output; and
      a nonlinear gain fiber comprising an input and an output, wherein the nonlinear gain fiber is configured to amplify and broaden the electromagnetic radiation from the seed laser;
   generating electromagnetic radiation from the pump laser;
   coupling the pump laser electromagnetic radiation and the seed laser electromagnetic radiation into the input of the fiber coupler;
   coupling the output of the fiber coupler into the input of the nonlinear gain fiber; and
   coupling out the amplified and broadened electromagnetic radiation from the nonlinear gain fiber.

25. The method of claim 24, wherein the dispersion of the nonlinear gain fiber over the spectral bandwidth of the supercontinuum light is substantially zero.

26. The method of claim 24, wherein the dispersion of the nonlinear gain fiber over the spectral bandwidth of the supercontinuum light is substantially normal dispersion.

27. The method of claim 24, wherein the dispersion of the nonlinear gain fiber over the spectral bandwidth of the supercontinuum light is substantially anomalous dispersion.

28. The method of claim 24, wherein the dispersion of the nonlinear gain fiber over the spectral bandwidth of the supercontinuum light is mixed normal dispersion, zero dispersion, and anomalous dispersion.

29. The method of claim 24, wherein the zero dispersion of the nonlinear gain fiber over the spectral bandwidth of the supercontinuum light is close to the signal spectrum.

30. The method of claim 24, wherein the zero dispersion of the nonlinear gain fiber over the spectral bandwidth of the supercontinuum light is away from the signal spectrum.

31. The method of claim 24, wherein the seed laser comprises a solid state laser or a fiber laser.

32. The method of claim 24, wherein the seed laser has a center lasing wavelength ranging between 100 nm and 20 μm.

33. The method of claim 24, wherein the amplified and broadened electromagnetic radiation coupled out of the nonlinear gain fiber has a wavelength ranging between 100 nm and 20 μm.

34. The method of claim 24, wherein the spectral bandwidth of the amplified and broadened electromagnetic radiation coupled out of the nonlinear gain fiber is broader than the spectral bandwidth of the seed laser electromagnetic radiation.

35. The method of claim 34, wherein the spectral bandwidth is broadened by at least one of: self phase modulation, Raman frequency shift, four wave mixing, and soliton fission.

36. The method of claim 24, wherein the spectral bandwidth of the amplified and broadened electromagnetic radiation coupled out of the nonlinear gain fiber is broader than the spectral bandwidth of the seed laser electromagnetic radiation and the gain spectrum supported by the gain medium of the nonlinear gain fiber.

37. The method of claim 36, wherein the spectral bandwidth is broadened by at least one of: self phase modulation, Raman frequency shift, four wave mixing, and soliton fission.

38. The method of claim 24, wherein the gain medium of the nonlinear gain fiber is at least one of: Ytterbium, Erbium, Thulium, Neodymium, Holmium, ytterbium doped potassium tungstates (such as Yb:KYW and Yb:KGW), yttrium aluminum garnet, yttrium orthovanadate, and Ti:Sapphire.

39. The method of claim 24, wherein the fiber material of the nonlinear gain fiber is at least one of: silica, Germanium, Fluoride, Chalcogenide, and ZBLAN.

40. The method of claim 24, wherein the gain medium of the seed laser is at least one of: Ytterbium, Erbium, Thulium, Neodymium, Holmium, ytterbium doped potassium tungstates (such as Yb:KYW and Yb:KGW), yttrium aluminum garnet, yttrium orthovanadate, and Ti:Sapphire.

41. The method of claim 24, wherein the nonlinear gain fiber comprises single cladding fiber or double cladding fiber.

42. The method of claim 24, wherein the nonlinear gain fiber comprises a photonic crystal fiber.

43. The method of claim 42, wherein the photonic crystal fiber comprises a solid-core microstructured fiber.

44. The method of claim 43, wherein the solid-core microstructured fiber is surrounded by a hexagonal array of air-holes configured to modify the dispersion profile of the photonic crystal fiber.

45. The method of claim 43, wherein the solid-core microstructured fiber is surrounded by a hexagonal array of airholes configured to flatten the dispersion profile of the photonic crystal fiber close to the electromagnetic radiation from the seed laser.

46. The method of claim 24, wherein the peak power of the supercontinuum light generation inside the nonlinear gain fiber is greater than 1 kW.

\* \* \* \* \*